Oct. 29, 1968
W. SAEGER
3,408,547
SYNCHRONIZING SYSTEM FOR SYNCHRONOUS MOTOR
UTILIZING A FREQUENCY DIVIDER
Filed Oct. 1, 1965
2 Sheets-Sheet 1

INVENTOR.
WALDEMAR SAEGER
BY Anthony D. Cennamo
Daniel Rubin
ATTORNEYS

INVENTOR.
WALDEMAR SAEGER
BY Anthony D. Cennamo
Daniel Rubin
ATTORNEYS

United States Patent Office 3,408,547

Patented Oct. 29, 1968

3,408,547

SYNCHRONIZING SYSTEM FOR SYNCHRONOUS MOTOR UTILIZING A FREQUENCY DIVIDER

Waldemar Saeger, La Canada, Calif., assignor to Xerox Corporation, Rochester, N.Y., a corporation of New York Filed Oct. 1, 1965, Ser. No. 492,252
3 Claims. (Cl. 318—18)

This invention relates to electromechanical synchronizing and phasing systems, circuitry and apparatus.

There are many applications for a device which will accurately synchronize and phase two systems remotely located from each other, where the means for connecting them to each other must necessarily consist of a minimum number of wires. Indeed, in most applications of this sort, it is necessary to time share the single communications path connecting two units with the data being transmitted from one to the other. The interconnection between two synchronized units need not necessarily be restricted to one where a wire path is involved. In the general case, communications media of any type may be used and the general requirement is that the rotating shaft positions of the remote and master devices, i.e., receiver and transmitter, are identical for very closely related spaced terminal equipments or are displaced by the same degree of time as is the data which is being transmitted where the units are widely separated.

Examples of applications where situations of this type are found are:

(1) Serially encoded remote communications printer;

(2) Commutated multiplexers and decoders;

(3) Facsimile systems;

(4) Remote computer input/output equipment which is synchronous in nature to a central computer.

The transmitter and receiver cannot always be presumed to be operating off of the same power supply source and, therefore, local power sources are often required. Present state of the art facsimile systems, for example, are generally limited to an initial coarse positioning or automatic spacing control. The assumption is made that synchronism will be maintained thereafter because the devices are either supplied from the same AC power supply network or else local crystal controlled AC power supply sources are used. Where local crystal controlled sources are used, the required frequency accuracy is extreme. For example, in a typical facsimile transmission, where a maximum skew per page of $\frac{1}{16}$ inch is allowable, the oscillator frequencies must be held to plus or minus 0.00034%.

It is accordingly an object of the invention to provide improved synchronizing means and methods to synchronize an electromechanical device to a remote source of synchronizing signals. It is a further object of the invention to synchronize two remotely located shafts which are rotating at relatively slow speeds, i.e., on the order of 180 r.p.m., with a relative positional accuracy better than 0.2 degree, rapidly and with low cost equipment that is adaptable to function in either a transmitter or a receiver.

The nature of the invention as well as further objectives thereof will become more apparent in connection with a description of certain embodiments of the invention.

Figure 1:
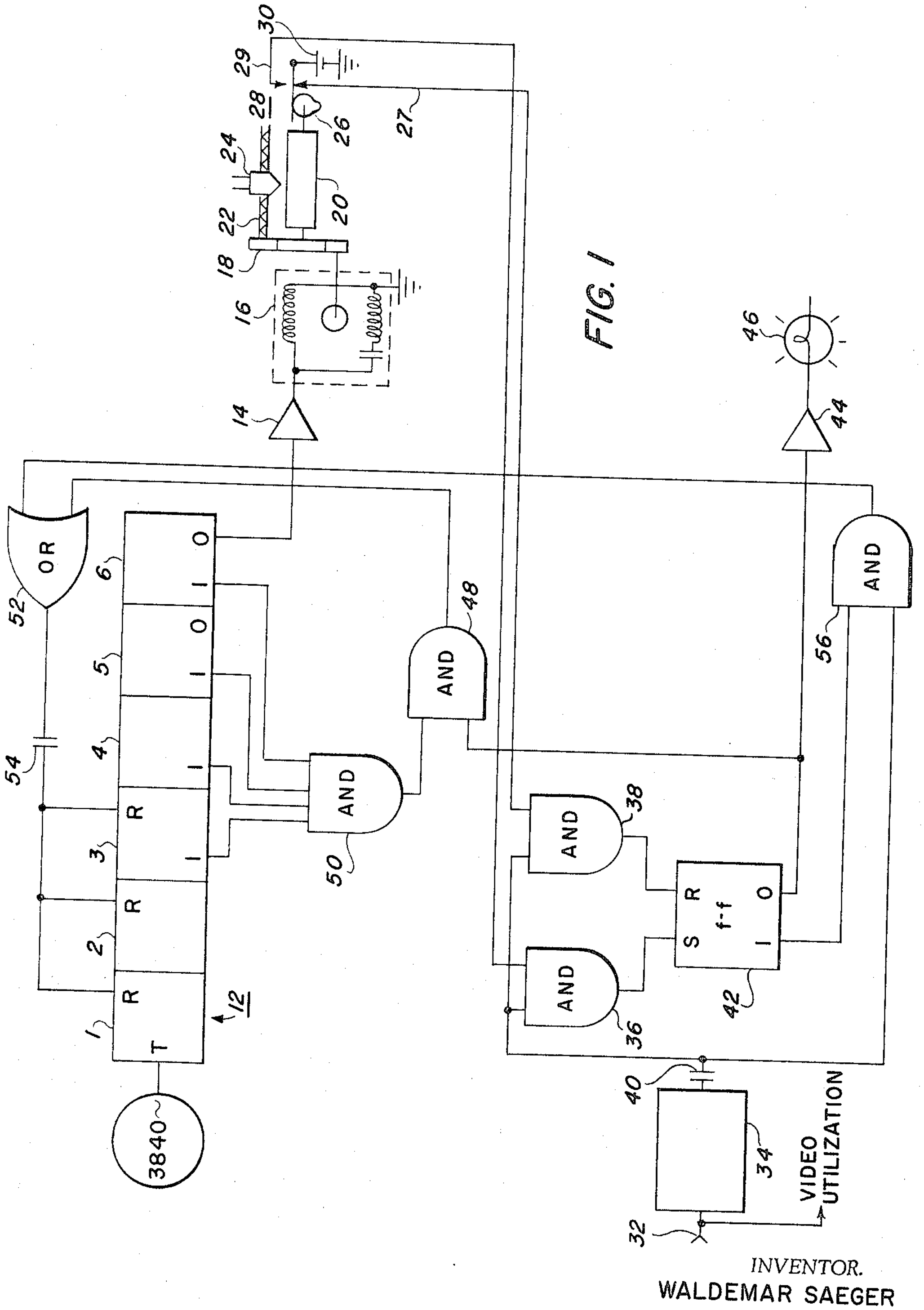
Figure 2:
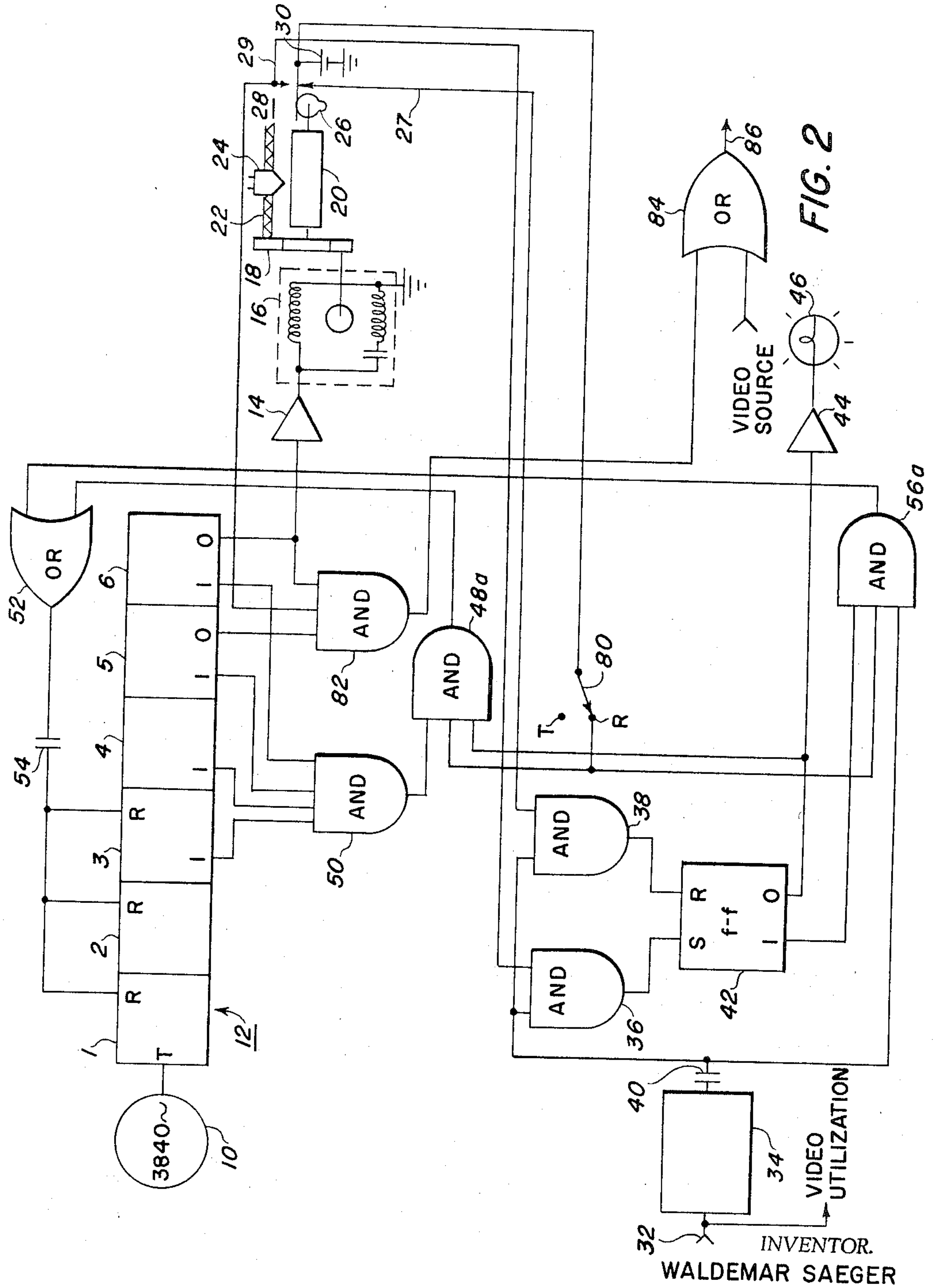

FIGURE 1 is a schematic diagram showing a facsimile receiver; and FIGURE 2 is a schematic diagram showing a facsimile transceiver.

Referring to FIGURE 1, there is shown a 3,840 cycle oscillator 10, which may be a low cost tuning fork oscillator with an accuracy of only plus or minus .05%. The output of oscillator 10 is connected to a six stage frequency divider 12, which may comprise six conventional and commercially available flip flop circuits interconnected in the conventional way to form a counter of divider chain. The 60 cycle square wave appearing at the "0" terminal of stage six is amplified by a power amplifier 14 and applied to a motor 16. Motor 16 should be of the salient pole synchronous type and preferably be a two-pole motor with a permanent magnet rotor in order that there be a unique relation between the position of the motor shaft and the phase of the voltage applied to the motor from amplifier 14. A set of gears 18 couples motor 16 to a facsimile drum 20 which is rotated at 180 r.p.m., which is $\frac{1}{20}$ of the rotor speed. Gears 18 also drive a lead screw 22 on which is mounted a marking device 24. Elements 22 and 24 are conventional in facsimile equipment and are shown for illustrative purposes only as representing a form of apparatus which may be synchronized by the invention. A cam 26 is affixed to drum 20 and operates a single pole double throw switch 28 so as to reverse the positions of the normally closed and normally open contacts 27 and 29 while the angular position of the drum lies between 354° and 6° of a fixed reference position, giving a contact time of 11.1 milliseconds. The movable contact of switch 28 is connected to a low voltage source 30 and applies this voltage to either normally closed contact 27 or normally open contact 29 depending upon the position of drum 20.

Incoming electrical signals are received at terminal 32 and include at least 4.2 millisecond synchronizing signals at $333\frac{1}{3}$ millisecond intervals. A synchronizing separator circuit 34 is provided to separate the synchronous signals from other incoming information signals. Circuit 34 will be determined by the form in which the synchronizing signals are received and may comprise a tone filter, an amplitude discriminator or the like. Where the synchronizing signal is received as a DC voltage level, it may be possible to dispense entirely with synchronizing separator circuit 34.

The synchronizing signal is applied to an input of AND gate 36 and of AND gate 38. The other input of AND gate 36 is connected to normally open contact 29 and the other input of AND gate 38 is connected to normally closed contact 27 of switch 28. The voltage of source 30 is chosen to correspond to the "1" voltage of the various logical gates used in the apparatus and accordingly an output will be obtained at either gate 36 or gate 38 depending upon whether the leading edge of the synchronizing pulse fell within or without the 12 millisecond switching interval of switch 28. A capacitor 40 may be installed in series with the output of separator circuit 34 to differentiate the synchronizing signals and insure that gates 36 and 38 are responsive only to the leading edge of the received synchronizing signal. AND gate 36 is connected to the "set" input of a flip flop 42 and AND gate 38 is connected to the "reset" input of the same flip-flop. Accordingly, flip-flop 42 will be set to the "1" state if synchronizing signals arrive during the actuating interval of switch 28 or will be set in the "0" state if incoming synchronizing signals arrive outside this interval. Elements 36, 38, 40 and 42 may be collectively constituted by a single commercially available gated flip-flop circuit.

The "0" state of flip-flop 42 is indicative of an out-of-synchronization condition and the "0" output terminal is connected to an amplifier 44 which supplies the necessary power to operate an out-of-synchronization indicator lamp 46. This same output of flip-flop 42 is also applied to one input of an AND gate 48, the other input of which is connected to the output of a further AND gate 50. Progressing backwards, the four inputs and AND gate 50 are connected to the "1" outputs of stages 3, 4, 5 and 6 of divider 12. When stages 3, 4, 5 and 6 are in the "1" state, corresponding to a count of 60, gate 50 generates an output signal which is enabled to pass through AND gate 48 because of the simultaneous presence of the signal from the "0" output of flip flop 42. The signal from gate 48 passes through OR gate 52 and capacitor 54 and is applied to the "reset" terminals of stages 1, 2 and 3 of divider 12. All stages of the divider are thereby cleared directly to "0" and in this mode of operation divider 12 therefore divides by a factor of 61 rather than 64 and delivers an output frequency of approximately 63 cycles to motor 16.

Within a time less than seven seconds motor 16, now operating at 5% above normal speed, will cause drum 20 to catch up with the incoming synchronizing signals so that coincidences will be detected between the synchronizing signals and normally open contact 29 of switch 28, rather than with normally closed contact 27. These coincidences will be detected by AND circuit 36 and will reset flip flop 42 to the "1" state. With flip-flop 42 in the "1" state, lamp 46 is extinguished and the coincidence pulses from gate 50 are prevented from passing through gate 48, thereby restoring divider 12 to its normal dividing ratio of 64. Coincidences are now detected between incoming synchronizing signals and the "1" output of gate 42 is an AND gate 56, and these coincidences are passed through OR gate 52 into the "reset" terminals of the first three stages of divider 12. In this mode of operation, divider 12 is reset to zero by the arrival of an incoming synchronizing signal. As long as the count in divider 12 is over 56 but less than 7, an incoming sychronizing signal will reset all stages of divider 12 to "0." In this way the phase of the voltage applied to motor 16 can be regulated to within one cycle of the 3840 cycle oscillator 10 or to within $\frac{1}{64}$ of a cycle of 60 cycles. This corresponds to a positional error of drum 20 of about $\frac{1}{200}$ of a degree. Any subsequent drift of oscillator 10 from the correct phase relationship with the incoming synchronizing signals will be corrected in this same manner by each incoming sychronizing signal. The absence of an incoming synchronizing signal will not cause flip-flop 42 to reset to the "0" condition and motor 16 will continue to operate on $\frac{1}{64}$ of the oscillator frequency until the signals are again received. If there is a gross loss of synchronization, then flip-flop 42 will reset to the "0" state and motor 16 will be caused to speed up and repeat the previously described phasing process.

Innumerable variations may be made within the inventive concept illustrated in FIGURE 1. The number of stages or dividing ratio of divider 12 may be varied over wide limits as can the frequency of oscillator 10 and motor 16. Obviously, these variables should be so related that divider 12 divides the oscillator frequency by the proper integral number to obtain the desired operating frequency for motor 16. Various feed-back or gating circuits known to the art may be employed to vary the dividing frequency of the divider equally as well as the particular configuration illustrated. Likewise, the number of stages to which the reset pulses are applied can be varied at the discretion of the disigner, although it is desirable that at least the first stage or preferably the first two stages are so reset. Gears 18 should be so constructed as to divide the rotational speed of motor 16 by an integral number so as to maintain a unique correspondence between the angular phase of the motor and of the driven device, which might be a multiplexing commutator etc. instead of a facsimile copy drum. Chains, cog-belts, and the like may be used instead of gears. Cam 26 and switch 28 may be replaced by any equivalent device for generating an electrical signal in response to the position of a mechanical device. Further, the circuit illustratively employs AND gates and OR gates, but it is clearly within the skill of the ordinary circuit designer to employ NAND and NOR gates or other known forms of logical circuitry.

FIGURE 2 shows a slightly modified version of the circuit of FIGURE 1 and which is particularly adapted for use in a transceiver. The two-input AND gates 48 and 56 of FIGURE 1 have been replaced by three-input gates **48*a* and 56*a*. The third inputs of each of these gates are connected together through a switch 80 to voltage source 30. Switch 80 has two positions corresponding to operation as a transmitter or receiver. In the illustrated, or receive, position, switch 80 is closed and supplies a voltage from source 30 to gates 48*a* and 56*a*** which permits these gates to function in precisely the same manner as illustrated in FIGURE 1.

In the transmitting position of switch 80, the necessary voltage is not aplied to gates **48*a* and 56*a*, thus disabling these gates and allowing divider 12 to function as an ordinary divide-by-64 frequency divider. In this mode of operation, motor 16 is operated at a steady continuous speed. FIGURE 2 also includes a three-input AND gate 82 which detects coincidences between the "0" outputs of stages 5 and 6 of the divider and the closure of normally open contact 29 of switch 28. The output of gate 82 is a 4.2 millisecond pulse which occurs once during each revolution of drum 20 and which is very accurately timed with respect to the position of drum 20. This pulse serves as a transmitter synchronizing signal and can be combined with suitable video or other information signals in an OR gate 84. The output of this gate is applied to a transmitting terminal 86 from which it can be communicated to a terminal 32** of a remote device, which may be identical to that of FIGURE 2 and which is thereby synchronized to the device of FIGURE 2. FIGURE 2 clearly shows how the invention can be readily adapted for use as a receiver or transmitter without excessive or wasteful duplication of parts.

Certain possible variations of the invention have already been described and many others lie within the skill of those in the art. All such variaitons are part of the invention, except as limited by the following claims:

What is claimed is:

1. Synchronizing apparatus to synchronize a motor driven mechanical apparatus with an incoming periodic electrical synchronizing signal comprising:
   - a stable high frequency oscillator operating at a frequency $f$,
   - phase coherent dividing means to divide the frequency of said oscillator by a factor $n1$ to produce a divided frequency $f/n1$ suitable for application to a salient pole synchronous motor connected to said apparatus to provide approximate speed synchronism with said synchronizing signals,
   - means to connect the output of said divider to a motor connected to said apparatus,
   - pulse means operated by said apparatus to generate a local periodic pulse,
   - coincidence means to detect coincidences or non-coincidences between said synchronizing signals and local pulses,
   - means associated with said coincidence means and responsive to non-coincidences between said synchronizing signals and local pulses to cause the dividing means to divide by a factor $n2$ different from $n1$ thus producing an output frequency different from $f/n1$ and tending to drive the apparatus towards synchronism with said synchronizing signals and,
   - means connected to said coincidence means and responsive to coincidences to cause the dividing means to divide by a factor $n1$ and further connecting the synchronizing signals to said dividing means whereby each synchronizing signal resets said divider.

2. In a signal receiver the combination comprising:
   - a permanent magnet synchronous motor,
   - integral ratio gearing means connecting said motor to a driven element,
   - pulse means connected to said driven element and producing at least one pulse per revolution thereof,
   - a stable high frequency oscillator operating at frequency $f$,
   - a multi-stage frequency divider connected to said oscillator and adapted to divide by a factor of either $n1$ or $n2$, $f/n1$ being the normal frequency of said motor,
means connecting the output of said divider to said motor means,
means to detect coincidences between said pulse means and received pulses,
means responsive to the absence of coincidences to cause said divider to divide by $n2$ and,
means responsive to the presence of said coincidences to cause said divider to divide by $n1$ and to apply said received pulses to at least the first stage of said divider whereby at least said first stage is periodically reset by said pulses.

3. In a signal transceiver the combination comprising:
a permanent magnet synchronous motor,
integral ratio means connecting said motor to a driven element,
a stable high frequency oscillator operating at frequency $f$,
a multi-stage frequency divider connected to said oscillator and adapted to divide by a factor of $n1$, $f/n1$ being the normal frequency of said motor,
means connecting the output of said divider to said motor,
pulse means connected to said driven element and producing at least one pulse per revolution thereof, control means having transmit and receive conditions
means responsive to the transmit condition of said control means to detect coincidences between said pulse means and the output of at least the last stage of said divider and to transmit said coincidences as a synchronizing pulse to external equipment,
means responsive to the receive condition of said control means to detect coincidences between said pulse means and received synchronizing pulses,
means responsive solely to the absence of said coincidences to create a feedback loop around said divider whereby the counter divides by a number $n2$ less than $n1$ and,
means responsive solely to the presence of said coincidences to apply said received synchronizing pulses to said divider to periodically reset at least the first stage thereof.

References Cited

UNITED STATES PATENTS

| | | | |
|---|---|---|---|
| 2,874,343 | 2/1959 | Steele | 318—28 |
| 2,927,735 | 3/1960 | Scuitto. | |
| 3,317,805 | 5/1967 | Kay et al. | 318—231 |

BENJAMIN DOBECK, *Primary Examiner.*